United States Patent
Matheson

[19]

[11] Patent Number: 6,146,531
[45] Date of Patent: Nov. 14, 2000

[54] PROCESS AND APPARATUS FOR BIOLOGICALLY TREATING WATER

[75] Inventor: Mark A. Matheson, Edmond, Okla.

[73] Assignee: Oklahoma Rural Water Association, Oklahoma City, Okla.

[21] Appl. No.: 09/244,297

[22] Filed: Feb. 3, 1999

Related U.S. Application Data

[62] Division of application No. 08/591,355, Jan. 25, 1996, Pat. No. 5,954,963.

[51] Int. Cl.⁷ .................................................. C02F 3/06
[52] U.S. Cl. .......................................... 210/606; 210/610
[58] Field of Search ................................ 210/602, 605, 210/606, 610, 611, 620, 630, 631, 615–617, 750, 903

[56] References Cited

U.S. PATENT DOCUMENTS

| | | | |
|---|---|---|---|
| 4,209,390 | 6/1980 | Cabore et al. | 210/903 |
| 4,253,966 | 3/1981 | Lebesgue et al. | 210/610 |
| 4,756,831 | 7/1988 | Menzel et al. | 3/30 |
| 4,970,000 | 11/1990 | Eppler et al. | 3/34 |
| 5,211,547 | 5/1993 | Kanow | 210/610 |
| 5,211,847 | 5/1993 | Kanow | 3/4 |
| 5,413,714 | 5/1995 | DeFilippi et al. | 210/617 |
| 5,414,198 | 5/1995 | Brodman et al. | 588/202 |
| 5,443,730 | 8/1995 | Letourneux et al. | 210/631 |
| 5,455,173 | 10/1995 | Crawford et al. | 210/610 |
| 5,514,278 | 5/1996 | Khudenko | 210/605 |
| 5,534,148 | 7/1996 | Suzuki et al. | 210/605 |
| 5,954,963 | 9/1999 | Matheson | 210/606 |

*Primary Examiner*—Chester T. Barry
*Attorney, Agent, or Firm*—Lawrence R. Watson; Gardere & Wynne, L.L.P.

[57] ABSTRACT

A process and apparatus for biologically treating water. The inventive process preferably comprises the steps of: (a) adding a sulfur-containing oxygen scavenger to the water in an amount effective for at least reducing the amount of dissolved free oxygen contained in the water; (b) removing at least a portion of a substance from the water by exposing the water to microorganisms effective for biologically removing the substance therefrom; and (c) feeding a biostimulant to the microorganisms effective for increasing the rate at which step (b) occurs. The inventive apparatus preferably comprises a system for adding the sulfur-containing oxygen scavenger to the source water stream and a system for feeding the biostimulant to the microorganisms.

4 Claims, 3 Drawing Sheets

PROCESS AND APPARATUS FOR BIOLOGICALLY TREATING WATER

This is a divisional of application Ser. No. 08/591,355 filed on Jan. 25, 1996, now U.S. Pat. No. 5,954,963.

FIELD OF THE INVENTION

The present invention relates to processes and apparatuses for biologically treating water. More particularly, but not by way of limitation, the present invention relates to processes and apparatuses for the biological denitrification of water.

BACKGROUND OF THE INVENTION

A need presently exists for an effective and efficient means for reducing nitrate and nitrite contaminant levels in groundwater and in other water supplies. A need particularly exists for such a water treatment process which is substantially odor free and which provides a treated water product containing little or no trihalomethanes and containing little or no volatile organic carbon compounds.

Some water treatment methods used heretofore for nitrate removal have involved ion exchange, reverse osmosis, or electrodialysis. Each of these methods, however, simply removes nitrate ions from one water stream and concentrates said ions in a second water stream. The second water stream must then be disposed of.

U.S. Pat. No. 5,211,847 discloses a multistage treatment system for the biological denitrification of secondary effluents from wastewater treatment plants. The system uses an upflow biological reactor containing denitrifying bacterial growths supported on rigid, corrugated plastic panels. Upstream of the biological reactor, an organic carbon nutrient source (e.g., methanol) is added to the water. To obtain the oxygen necessary for consuming the carbon source, the denitrifying bacteria break down nitrate and nitrite contaminants contained in the water stream. The break down of the nitrate and nitrite contaminants yields a nitrogen gas product which is released to the atmosphere.

Before breaking down the nitrate and nitrite contaminants, the bacteria used in the U.S. Pat. No. 5,211,847 system must first consume any free oxygen (i.e., $O_2$) dissolved in the water stream. The need to biologically consume the dissolved free oxygen increases the amount of carbon source which must be fed to the bacteria and also increases the required size of the biological reactor. Feeding additional organic carbon material to the bioreactor increases the amount of odor produced by the biological process and generally increases the amounts of volatile organic carbons and trihalomethanes contained in the treated water product. Further, the use of additional organic carbon source increases the amount of chlorine which must be used to disinfect the treated water product. Moreover, removing the dissolved free oxygen solely by biological means results in (a) excessive biomass growth, (b) blockage of reactor flow passages, and (c) an increase in the amount of start up time required to achieve full reactor denitrification activity.

U.S. Pat. No. 4,970,000 discloses a biological denitrification system wherein the free oxygen content of the source water stream is reduced prior to delivery to the denitrification reactor. Free oxygen removal is accomplished by either (a) reacting the free oxygen with hydrogen, (b) vacuum degassing, or (c) purging with nitrogen gas.

Each of the oxygen removal techniques disclosed in U.S. Pat. No. 4,970,000 has significant shortcomings. Vacuum degassing requires the use of a vacuum chamber and a vacuum pump. Nitrogen purging increases the nitrogen content of the water stream and thereby increases both the amount of carbon nutrient required and the size of the biological reactor. Hydrogen treatment requires the installation of a hydrogenation vessel. Hydrogen treatment also requires the use of a costly precious metal catalyst which poses potential contamination problems.

The biological denitrification reactor used in the U.S. Pat. No. 4,970,000 system contains a fluidized sand bed populated with denitrification bacteria. Caking of the reactor sand bed can occur as a result of system shutdown and/or excessive biomass growth. To prevent such caking, it is necessary to intermittently blow air through the sand bed and to stir the sand bed using an agitator. Unfortunately, when air is injected into the reactor bed, the resulting introduction of free oxygen substantially reduces the nitrogen removal efficiency of the reactor. Full nitrogen removal efficiency is not recovered until all of the free oxygen is either consumed or flushed from the reactor.

As with U.S. Pat. No. 4,970,000, U.S. Pat. No. 4,756,831 discloses a biological denitrification system wherein, prior to introduction into the biological reactor, free oxygen is removed from the water source by oxidation with hydrogen.

Sulfites have been used heretofore in boiler units and in other hot water applications to reduce oxygen levels and thereby alleviate equipment corrosion problems. However, since sulfites react with free oxygen at a much slower rate in cold water than in hot water, sulfites have not been considered heretofore for use as oxygen removal agents in biological denitrification processes.

SUMMARY OF THE INVENTION

The present invention provides a water treatment process and a water treatment apparatus which satisfy the needs and alleviate the problems discussed hereinabove.

In one embodiment, the inventive water treatment process comprises the steps of: (a) adding a sulfur-including oxygen scavenger to the water in an amount effective for at least reducing the amount of free oxygen dissolved in the water and (b) removing at least a portion of a substance from the water by exposing the water to microorganisms effective for removing the substance from the water. In cases where the substance is removable by biological denitrification, step (b) can comprise the use of a biological denitrification process.

Another embodiment of the inventive water treatment process comprises the steps of: (a) removing at least a portion of a substance from the water by exposing the water to microorganisms effective for biologically removing the substance therefrom and (b) feeding a biostimulant to the microorganisms effective for increasing the rate at which step (a) occurs. If the substance is removable by biological denitrification, step (a) can comprise the use of a biological denitrification process.

In yet another embodiment, the inventive water treatment process comprises the steps of: (a) removing at least a portion of a substance from the water by biological denitrification using microorganisms effective for performing the biological denitrification process and (b) adding enzymes to the water effective for increasing the rate at which the biological denitrification occurs.

In still another embodiment, the inventive water treatment process comprises the steps of: (a) removing at least a portion of a substance from the water by biological denitrification using microorganisms effective for performing the biological denitrification; (b) feeding an amount of a carbon source to the microorganisms effective for causing the microorganisms to perform the biological denitrification; and (c) feeding a biostimulant to the microorganisms in an amount effective for reducing the amount of carbon source required for causing the microorganisms to perform the biological denitrification.

In one embodiment, the inventive water treatment apparatus comprises: (a) means for at least reducing the amount of free oxygen in the water by adding to the water a sulfur-including oxygen scavenger and (b) denitrification means for removing at least a portion of a substance from the water by biological denitrification.

In another embodiment, the inventive water treatment apparatus comprises: (a) denitrification means for removing at least a portion of a substance from the water by biological denitrification and (b) biostimulant addition means for adding a biostimulant to the denitrification means to thereby increase the rate at which the biological denitrification occurs.

Further objects, features, and advantages of the present invention will be apparent to those skilled in the art upon reference to the accompanying drawings and upon reading the following description of the preferred embodiments.

DESCRIPTION OF THE PREFERRED EMBODIMENTS

Figure 1:
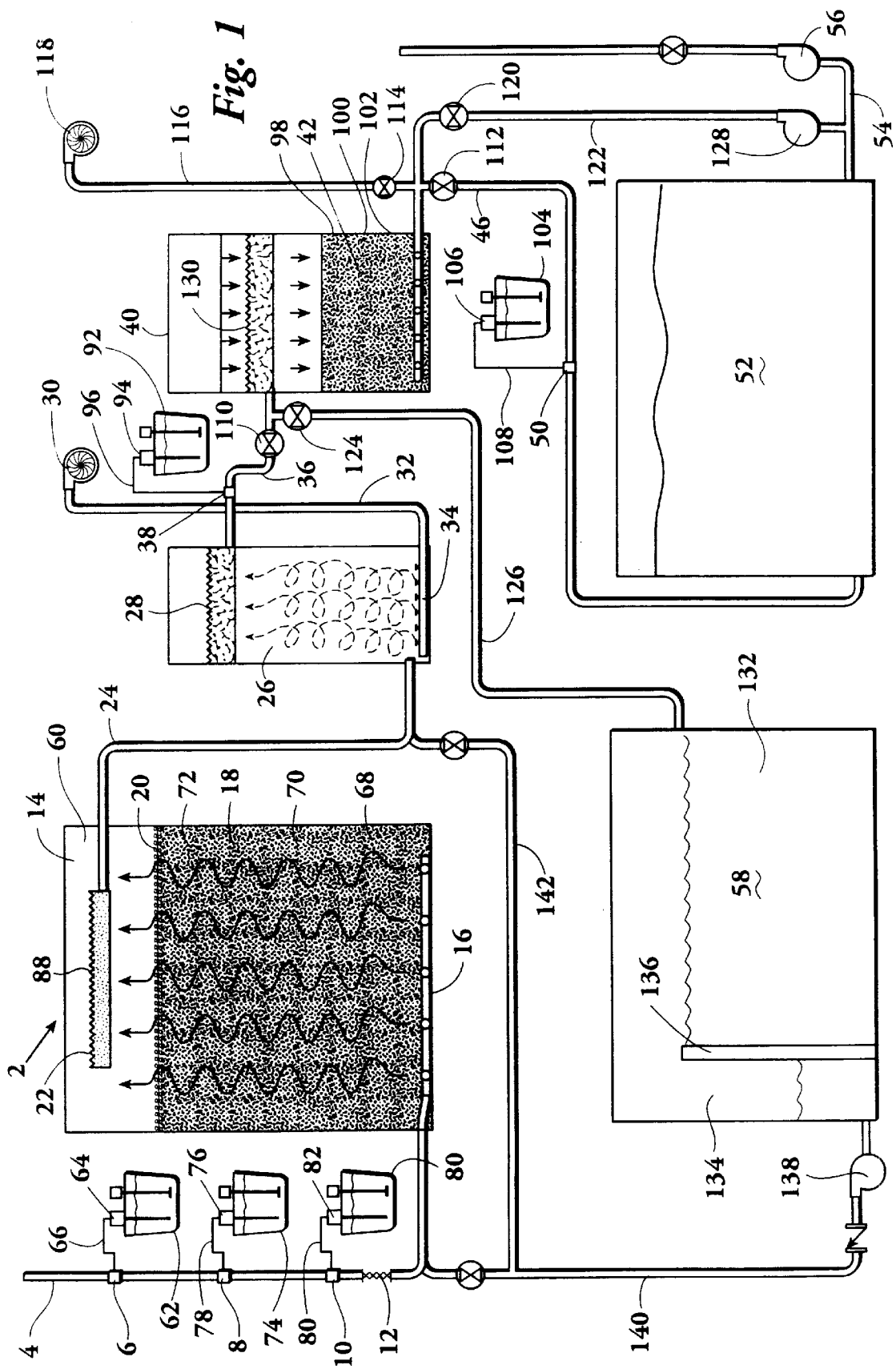
FIG. 1 provides a schematic diagram depicting preferred embodiments of the inventive process and apparatus.

An embodiment 2 of the inventive apparatus is schematically depicted in FIG. 1. Inventive apparatus 2 includes: a bioreactor 14; an aeration basin 26; a multimedia filter 40; a product water tank 52; and a backwash basin 58.

Bioreactor 14 preferably comprises an open topped vessel 60 having a submerged, packing-type media bed 18 provided therein. Bacteria effective for biological denitrification are attached to and supported on media 18. A flow-through grate 20 is fixed in vessel 60 on top of media bed 18 to hold the media in place and prevent the media from flowing out of bioreactor 14.

A source water stream to be treated in inventive apparatus 2 is delivered to bioreactor 14 via conduit 4. As used herein, the term "conduit" refers to piping or to any other conduit-type structure suitable for conveying process streams of the type encountered in the inventive process. Disposed in conduit 4 are: an oxygen scavenger injection point 6; a carbon nutrient injection point 8 located downstream of scavenger injection point 6; a biostimulant injection point 10 located downstream of nutrient injection point 8; and an in-line static mixer 12 located downstream of biostimulant injection point 10.

The oxygen scavenger is delivered by pump 64 from vessel 62 to injection point 6 via conduit 66. If necessary, the oxygen scavenger can be diluted in vessel 62 with a sufficient amount of potable water to provide a pumpable slurry.

It is preferred that, upon injection of the oxygen scavenger, carbon nutrient source, and biostimulant, the source water stream be delivered directly to bioreactor 14 so that most (preferably substantially all) of the oxygen scavenger reacts within the lower portion 68 of reactor bed 18.

The oxygen scavenger thus works with the bacteria contained in lower bed portion 68 to remove most (preferably substantially all) of the dissolved oxygen contained in the source water stream. Consequently, the oxygen requirements of the bacteria contained in the mid and upper portions 70, 72 of reactor bed 18 must be met substantially entirely by the biological breakdown of nitrate and/or nitrite contaminants contained in the source water stream.

Since the oxygen scavenger removes dissolved free oxygen which would otherwise have to be biologically removed in reactor 18, the use of an oxygen scavenger reduces the amount of carbon nutrient required for completion of the denitrification process and also reduces the required size of bed 18 and of bioreactor vessel 60.

Lower portion 68 of reactor bed 18 preferably comprises in the range of from about 20% to about 35% of the total volume of reactor bed 18.

In an alternative embodiment, a holding tank (not shown) could be provided upstream of reactor 14 to ensure that substantially all of the oxygen scavenger reacts prior to reaching bioreactor 14. However, allowing at least most of the oxygen scavenger to react within lower portion 68 of reactor bed 18 eliminates the need for a separate holding tank and, since the bacteria in lower bed portion 68 also operate to remove dissolved oxygen, reduces the amount of oxygen scavenger required to complete the deoxygenation process.

A sufficient amount of carbon nutrient source is fed to the bioreactor bacteria to complete the biological denitrification process. The carbon nutrient source is delivered by pump 76 from vessel 74 to injection point 8 via conduit 78.

The biostimulant used in the inventive process is delivered by pump 82 from tank 80 to injection point 10 via conduit 84. The biostimulant preferably increases the energy level of the reactor biomass and thereby enhances biomass enzyme production such that the biomass more readily metabolizes the injected carbon nutrient material. As a result of the increased metabolism rate, the reactor bacteria also consume oxygen at an increased rate such that the biological denitrification process is accelerated.

By accelerating the rates at which organic metabolism and nitrogen reduction occur in reactor bed 18, the use of a biostimulant provides numerous benefits. Increasing the rate of nutrient consumption in reactor bed 18 helps to ensure that essentially all of the carbon nutrient material is completely metabolized. Thus, process odor, product volatile organic carbon content, product trihalomethane content, chlorine disinfectant demand, and the amount of carbon nutrient required to achieve a given denitrification efficiency are all reduced. Additionally, by increasing the efficiency of bioreactor 14, the injection of a biostimulant desirably limits biomass growth in reactor bed 18 and thereby helps to prevent biomass plugging and sloughing problems.

In-line static mixer 12 operates to thoroughly blend the oxygen scavenger, carbon nutrient material, and biostimulant with the source water stream. In order to prevent excessive biomass accumulation and growth in conduit 4, carbon nutrient and biostimulant injection points 8 and 10 are preferably located only a very short distance upstream of bioreactor 14.

Conduit 4 delivers the source water stream to a lateral distribution grid 16 positioned in bioreactor 14 beneath media bed 18. The water exiting distribution grid 16 flows upward through media bed 18.

Lateral distribution grid 16 is preferably composed of a plurality of horizontally extending polyvinyl chloride piping branches having holes or other fluid flow apertures provided along the tops thereof. Grid 16 extends over substantially the entire horizontal cross section of bioreactor vessel 60 and preferably includes a sufficient number and arrangement of flow apertures to ensure that the source water stream is evenly delivered to the bottom of media bed 18. The number and size of the flow apertures provided in grid 16 is preferably such that the water exits each aperture at a velocity in the range of from about 2 to about 5 feet per second. Most preferably, water exits each aperture at a velocity of approximately 3.5 feet per second.

The biological breakdown of nitrate and nitrite compounds in bioreactor 14 produces a nitrogen gas product. The source water stream preferably flows upward through reactor bed 18 at a rate sufficient to carry the resulting nitrogen gas bubbles to the top of bioreactor 14. However, the source water stream also preferably travels through bed 18 slowly enough to prevent significant amounts of biomass from being removed from bed 18 and carried to the water surface. Upon reaching the upper water surface, the nitrogen gas bubbles are simply released to the atmosphere through the open top of bioreactor 14.

Figure 2:
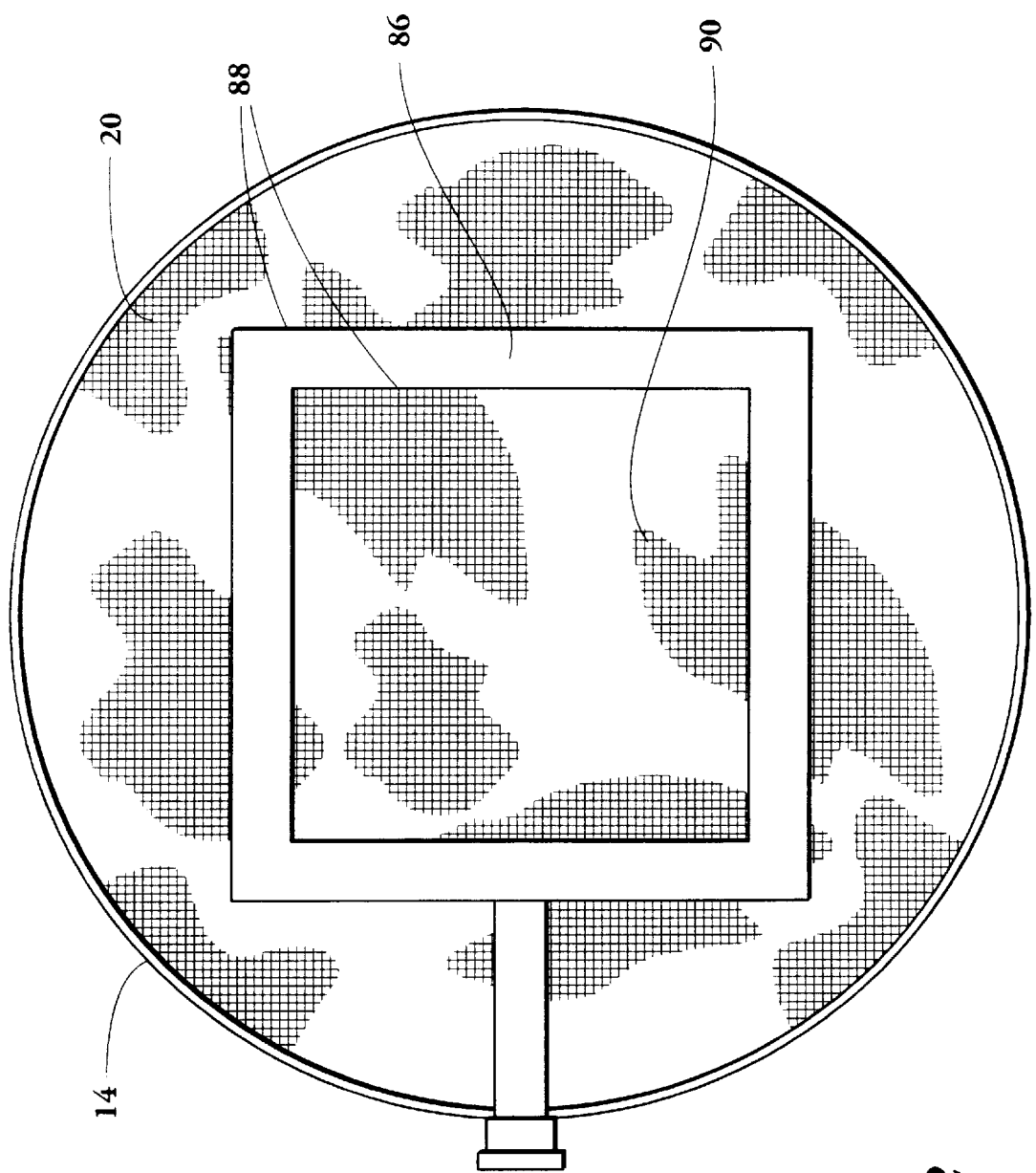
FIG. 2 provides a top view of a bioreactor 14 used in inventive apparatus 2.

Biologically treated water is preferably removed from the upper portion of bioreactor 14 by means of a reactor effluent trough 22 of the type depicted in FIGS. 1 and 2. Effluent trough 22 includes an open topped flow channel having serrated upper interior and exterior side edges 88. Effluent trough 22 has an open center portion 9 and preferably has either a large, square shape or some other shape (e.g., a large circular ring shape) whereby trough 22 draws treated water substantially evenly from the entire water surface. Most preferably, effluent trough 22 is shaped and sized such that none of the surface water removed from bioreactor 14 must travel a distance greater than three feet to reach effluent trough 22. Drawing water evenly from the water surface in this manner helps prevent the development of short circuiting flowpaths through bioreactor bed 18.

Water collected in reactor effluent trough 22 flows from bioreactor 14 by means of conduit 24 to the bottom of aeration basin 26. At the same time, air blower 30 delivers air to the bottom of aeration basin 26 via conduit 32 and air diffuser 34. Blower 30 preferably delivers air to aeration basin 26 at a rate of approximately 1.5 standard cubic feet per gallon of water flow. The air is evenly distributed by diffuser 34 across the bottom of aeration basin 26. The air stream flows upwardly at a rate substantially exceeding the upward flow velocity of the water so that the air intimately contacts and mixes with the water stream. Aeration basin 26 is preferably sized to provide a water retention time of at least 15 (preferably in range of from about 20 to about 30) minutes.

The aeration process strips nitrogen and other dissolved gases from the water stream and replaces such gases with dissolved oxygen. The aeration process also oxidizes any residual organics and any unwanted inorganic compounds (e.g., iron and manganese) contained in the water stream. Aeration basin 26 preferably has an open top such that the air and stripped materials simply flow through the top of basin 26 and are released to the atmosphere.

As will be understood by those skilled in the art, aeration systems of the type described herein are commonly employed in water treatment processes and are available from various commercial manufacturers.

Upon reaching the upper portion of aeration basin 26, the water stream is drawn out of basin 26 by means of an effluent trough 28. Effluent trough 28 preferably comprises a structure, similar to reactor trough 22, having an open top flow channel.

The aerated water stream flows from aeration basin 26 to multimedia filter 40 via conduit 36. As the aerated water stream flows through conduit 36, chlorine can optionally be injected into the stream at pre-filter chlorination injection point 38. Chlorine is preferably intermittently injected at injection point 38 in an amount sufficient to prevent significant bacterial growth from occurring within multimedia filter 40.

Liquid chlorine or a chlorine solution is delivered by pump 94 from tank 92 to injection point 38 via conduit 96. Alternatively, chlorine gas can be injected at point 38 using, for example, a standard vacuum regulator/injector system.

The bed 42 of multimedia filter 40 preferably comprises: a top layer 98 comprised of granular, activated carbon; an intermediate layer 100 comprised of silica sand; and a bottom layer 102 comprised of garnet. In comparing the relative degrees of coarseness and the relative specific gravities of the three filter layers, top layer 98 has a high relative coarseness and a low relative specific gravity, intermediate layer 100 has an intermediate relative coarseness and an intermediate relative specific gravity, and bottom layer 102 has a low relative coarseness and a high relative specific gravity.

As will be understood by those skilled in the art, a layered filter bed of this type allows longer runs between backwashings by ensuring that larger particulate materials are trapped in the upper portion of bed 42 while smaller particulates are trapped in the lower portion of bed 42. In order to allow continuous operation of inventive system 2, two or more parallel filters 40 can be provided such that when a given one of the individual filters is taken off-line for backwashing, the other filter(s) can remain in operation.

Multi-media filter systems of the type described herein are commonly employed in water treatment processes and are available from various commercial manufacturers.

Aerated water is delivered by conduit 36 to the upper portion of filter 40 and flows gravitationally downwardly through filter bed 42. The water stream preferably flows downwardly through filter bed 42 at a rate in the range of from about 3 to about 4 gallons per minute per square foot of the horizontal cross-sectional area bed 42.

A water collector/backwash distributor 44 provided in the bottom of filter 40 collects the filtered water stream as it travels through bed 42. Various types of suitable collection/distribution systems are commercially available. Example includes: false bottom underdrains; porous plate underdrains; lateral collection grids; and tile underdrains. Collection/distribution system 44 is preferably a lateral collection grid comprising perforated piping segments wrapped with a mesh screen. The mesh screen should be sized to allow free water flow into the grid while blocking the flow of filter media particles.

Filtered water received in collector/distributor 44 flows to product water tank 52 via conduit 46. If the filtered water product is to be used for human consumption, the water product is preferably disinfected by injecting chlorine at chlorine injection point 50. When chlorine is also injected at pre-filter chlorination point 38, the amount of disinfectant chlorine required at injection point 50 is typically reduced.

Chlorine is delivered by pump 106 from tank 104 to injection point 50 via conduit 108. Alternatively, chlorine gas can be injected at point 50 using, for example, a standard vacuum regulator/injector system.

Product water tank 52 provides sufficient chlorine contacting time to ensure that the product water stream is adequately disinfected. Tank 52 also preferably provides sufficient capacity to meet product water storage and filter backwashing needs. Purified product water can be conducted by product pump 56 from tank 52 via conduit 54.

Due to the collection of particulates in filter bed 42, multimedia filter 40 must be periodically backwashed. The preferred backwashing procedure includes an air blowing step followed by a water backwashing step. A pressure sensor can be provided downstream of filter 40 such that, when the outlet pressure of filter 40 drops below a predetermined point, aerated water flow to filter 40 is shut off and the backwashing procedure automatically begins.

The blowing stage of the backwashing procedure begins with the closing of filter inlet and outlet valves 110 and 112 and the opening of air valve 114. Air blower 118 is then operated to deliver air to the bottom of filter 40 via conduit 116 and collector/distributor 44. Air is preferably delivered to filter 40 at a rate effective for churning filter bed 42 sufficiently to free debris trapped in bed 42. Blower 118 is then shut off and blower valve 114 is closed. Before beginning the water backwashing step, filter bed 42 is preferably allowed sufficient time to settle back into place.

The water backwashing step begins with the opening of valve 120 disposed in backwash supply water conduit 122 and the opening of valve 124 disposed in backwash effluent conduit 126. Backwashing water is then delivered by pump 128 from product water tank 52 to collector/distributor 44 via conduit 122. The backwash expels air trapped in filter bed 42 and expands filter bed 42. Preferably, an adequate amount of backwashing water is delivered to filter 40 such that the upward backwash flow through the filter media bed expands the bed volume sufficiently to allow particulate debris to be carried upward from all three layers of bed 42. Most preferably, a sufficient amount of backwashing water is delivered to filter 40 to provide an upward flow rate through filter bed 42 of approximately 15 gallons per minute per square foot of filter bed cross-sectional area. At this rate, the upward backwash flow expands the media bed volume by about 50%

The backwash water stream is collected in backwash effluent trough 130 provided above filter bed 42. Backwash effluent trough 130 can be constructed and configured in the same manner as aeration effluent trough 28.

Backwash water collected in trough 130 flows via conduit 126 to backwash basin 58. Backwash basin 58 preferably includes a settling compartment 132 and a decanted water compartment 134. A weir 136 separates compartment 134 from compartment 132. Backwash water is initially delivered to settling compartment 132. Sufficient capacity is provided in compartment 132 for solids to settle to the bottom of basin 58. The backwash water then flows over weir 136 and into compartment 134.

If the decanted water received in compartment 134 has a high organic content, the water can be delivered by decant pump 138 via conduit 40 to reactor inlet conduit 4. If, on the other hand, the decanted water has a low organic content, the decanted water can be delivered by pump 138 via conduits 140 and 142 to aeration basin inlet conduit 24.

When the flow of backwashing water to filter 40 is terminated, the differing relative specific gravities of the filter bed materials allow filter bed layers 98, 100, and 102 to settle back to their proper relative positions.

The oxygen scavenger used in the present invention is preferably comprised of one or more sulfur-including compounds which will react with and thereby remove dissolved free oxygen contained in the source water stream. Examples of suitable sulfur-including compounds include: sodium sulfite, sodium bisulfite, sodium thiosulfite, sodium metabisulfite, and sulfur dioxide. The oxygen scavenger used in the present invention is preferably comprised of one or more sulfite compounds selected from the group consisting of: sodium sulfite, sodium bisulfite, sodium thiosulfite, and sodium metabisulfite. The oxygen scavenger used in the present invention is most preferably sodium sulfite.

Preferably, a sufficient amount of oxygen scavenger is used to ensure that the deoxygenation process is substantially completed in the lower portion 68 of bioreactor bed 18. Oxygen scavenger is most preferably added to the source water stream in an amount in the range of from about 1.5 to about 4.5 parts per part of dissolve free oxygen.

The oxygen scavengers used in the present invention react with dissolved free oxygen contained in the source water stream to form sulfates. Such sulfates substantially remain in the water stream but are produced in such minute quantities that their presence is not significant. Further, any excess oxygen scavenger added to the source water stream forms a precipitate which is removed by filter 40.

Examples of denitrification bacteria suitable for use in the present invention are disclosed in U.S. Pat. Nos. 4,756,831, 4,970,000, and 5,211,847. The entire disclosure of each of these references is incorporated herein by reference.

The denitrification bacteria used in the present invention is/are preferably naturally occurring, soil-dwelling bacteria. Examples of suitable soil-dwelling bacteria include: thiobacillus denitrificans, micrococcus denitrificans, and various species of serratia pseudomonas and achromabacter. Such naturally occurring bacteria will typically be present in any groundwater stream delivered for treatment to inventive apparatus 2. If naturally occurring denitrifying bacteria are present in the source water stream, then, regardless of the type of bacteria initially used to seed bioreactor bed 18, the naturally occurring source water bacteria will likely become dominant in the denitrification process.

Seed bacteria suitable for starting up the inventive system are available from various commercial suppliers. Bioreactor bed 18 can be initially seeded with denitrification bacteria by (1) filling bioreactor 14 with raw source water to a level above the top of reactor bed 18, (2) pouring seed bacteria directly into the open top of bioreactor 14, (3) adding carbon nutrient material to bioreactor 14, and (4) blowing air into the lower portion 68 of reactor bed 18. During the seeding process, the carbon nutrient material can be continuously added to bioreactor 14 via a conduit (not shown) extending from the discharge of nutrient pump 76 to the top of bioreactor 14. The air blown into lower bed portion 68 can be delivered by means of an air conduit (not shown) extending from the discharge of air blower 30.

Carbon nutrient materials suitable for conducting the inventive denitrification process are disclosed, for example, in U.S. Pat. Nos. 4,756,831, 4,970,000, and 5,211,847. Examples of preferred carbon nutrient materials include: ethanol, acidic acid, glucose, sugar, corn syrup, and methanol. Methanol and ethanol are typically more rapidly metabolized by the denitrification bacteria and are therefore preferred for use in the inventive system.

Assuming that the treated water product is to be used for human consumption, the amount of carbon nutrient material added to the source water stream will preferably be an amount effective to achieve a total nitrate and nitrite ion concentration in the bioreactor effluent stream not exceeding 4 parts per million by weight (as nitrogen) based on the total weight of the bioreactor effluent stream. Assuming, for example, that the carbon nutrient material is ethanol, the nutrient material will preferably be added to the source water stream in an amount in the range of from about 2.5 to about 4 parts per million by weight per each part per million by weight (as nitrogen) of nitrate and nitrite present in the source water stream.

The biostimulant used in the inventive system is preferably a material derived from at least one plant steroidal compound. Examples of suitable commercially available biostimulants include: compounds derived from sea kelp steroids, compounds derived from aloe plant steroids, and compounds derived from yucca cactus plant steroids.

The biostimulant is preferably added to the source water stream in an amount effective for increasing the rate at which biological denitrification occurs in bioreactor 14. Typically, the biostimulant will preferably be added in an amount effective to provide a biostimulant concentration in the range of from about 0.2 to about 0.4 parts by weight of biostimulant per million parts by weight of source water.

As an alternative to or in addition to the use of a biostimulant, enzymes effective for assisting and accelerating the biological denitrification reaction can be added to the source water stream.

The support media used in forming bioreactor media bed 18 is preferably a synthetic (e.g., plastic) packing-type media wherein the maximum linear dimension of each individual piece of media is preferably in the range of from about 0.75 to about 2.5 inches.

Figure 3:
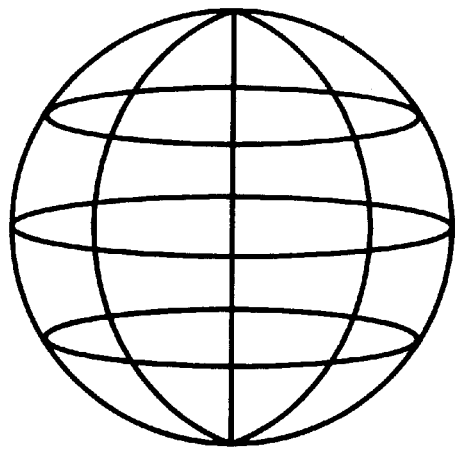
FIGS. 3, 4, and 5 depict examples of packing-type media suitable for use in filling a media bed 18 contained in bioreactor 14.
Figure 4:
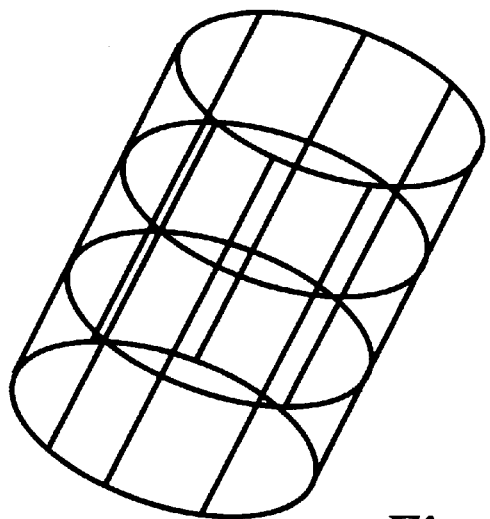
Figure 5:
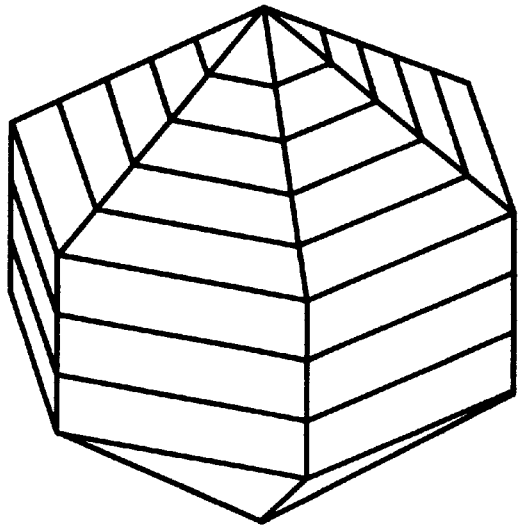

Examples of suitable media element figurations are depicted in FIGS. 3, 4, and 5. Such media configurations (a) allow suitable water flow through and around the individual media pieces; (b) provide a large amount of available surface area for biomass attachment per unit volume of bulk media; (c) provide a nonuniform configuration which prevents the formation of shortcircuiting flow paths through media bed 18; (d) provide biomass contact in all directions of water flow through the media; (e) provide void spaces large enough to prevent the biomass from bridging between the media surfaces and thereby plugging the media; and (f) provide a very high bulk void volume which facilitates water flow and water retention within media bed 18. By preventing biomass bridging and plugging, the preferred media also eliminates the need to inject compressed air into the bioreactor to clear biomass overgrowth from the media flow passages.

Most preferably, the media comprising bioreactor media bed 18 will (a) provide in the range of from about 30 to about 45 square feet of surface area per cubic foot of bulk media; (b) provide a bulk void volume which is at least 93% of the total bulk volume of the media; and (c) provide, when packed in bioreactor 14, a multitude of horizontal, vertical, and diagonal surfaces for continually redirecting and mixing water throughout bioreactor bed 18.

For any given application, bioreactor 14 and bioreactor bed 18 will be sized to accommodate the source water flow rate and to provide a desired degree of denitrification efficiency. The horizontal cross-sectional area of bioreactor bed 18 will preferably be sufficiently large such that the upward water flow velocity through bed 18 does not exceed 2.5 inches per minute. Typically, reactor bed 18 should be sized to provide at least 15 cubic feet of bulk media per each gallon per minute of water flow through bioreactor 14.

For potable water applications, reactor 14 and bed 18 should be sized to yield a combined nitrate and nitrite ion concentration, as nitrogen, in the bioreactor effluent stream not exceeding 3 parts by weight per million parts by weight of water. In such applications, the combined concentration, as nitrogen, of nitrate and nitrite ions in the bioreactor effluent stream will preferably not exceed 1 part per million by weight.

Using the inventive system, biological denitrification efficiencies exceeding 90% are readily obtainable. Thus, in addition to the many advantages and benefits mentioned above, the present invention provides further cost advantages by allowing a substantial quantity of untreated water to be blended with the treated product water stream to yield a combined water product which meets purity requirements.

Although the present invention has been discussed in terms of biological denitrification, it will be apparent to those skilled in the art that the inventive system can be used for any biological treatment process wherein microorganisms are employed to remove source water contaminants. In each case, the microorganisms, nutrients, and biostimulants used in the inventive process will be selected based on the particular contaminants which are to be biologically removed.

EXAMPLE 1

Using a pilot plant configured in the manner depicted in FIG. 1, 5 GPM of a source water stream having a nitrate content of 57.46 parts per million by weight (13 parts per million by weight as nitrogen) and a dissolved oxygen content of 12.5 parts per million by weight was conducted via conduit 4 to distribution grid 16 positioned in the bottom of bioreactor 14. As the source water stream traveled through conduit 4, sodium sulfite, ethanol, and biostimulant (BYO-GON PX109, available from Byo-Gon Industries, derived from seal kelp and aloe plant steroids) were added to the source water stream in amounts sufficient to yield a sulfite concentration of 35 parts per million by weight, an ethanol concentration of 39 parts per million by weight, and a biostimulant concentration of 0.2 parts per million by weight.

Upon exiting distribution grid 16, the source water stream flowed upwardly through bioreactor bed 18. Bioreactor bed 18 was filled with a two inch extruded plastic packing material of the type depicted in FIG. 3 having naturally occurring denitrifying bacteria attached thereto. The media provided 34 square feet of surface area per cubic foot of bed and had a volumetric void content of 93 percent. Bioreactor bed 18 was cylindrical and had a diameter of six feet and a height of five feet. The upward velocity of the source water stream through bed 18 was 3.4 inches per hour and the residence time of the source water stream in bed 18 was three hours.

The lower portion 68 of bioreactor bed 18 comprised about 27 percent of the total volume of bed 18. The biomass contained in lower portion 68 worked together with the sodium sulfite additive to remove dissolved free oxygen from the source water stream such that, upon exiting lower portion 68, the source water stream had a dissolved oxygen content of less than 2.0 parts per million by weight. Thus, the oxygen requirements of the bacteria contained in mid and upper portions 70, 72 of bioreactor bed 18 were met almost entirely by the breakdown of the nitrate ions contained in the source water stream.

Upon flowing through the top of bioreactor bed 18, the biologically treated water stream was collected in reactor effluent trough 22 and gravitationally flowed through conduit 24 to the bottom of aeration basin 26. Nitrogen gas produced in the denitrification process was expelled to the atmosphere through the open top of bioreactor 14. The biologically treated water stream exiting bioreactor 14 had a nitrate content of 5.50 parts per million by weight (1.24 parts per million by weight as nitrogen).

Aeration basin 26 was a rectangular basin having a length of two feet, a width of two feet, and a height of five feet. Blower 30 delivered air to the bottom of aeration basin 26 at a rate of 16 standard cubic feet per minute.

Aerated water arriving at the top of aeration basin 26 collected in aeration basin effluent trough 28 and flowed via conduit 36 to multimedia filter 40. The water stream then flowed downwardly through filter bed 42 and was received in lateral distribution grid 44. Filter bed 42 had a 1.5 feet by 2.0 feet rectangular cross section and a total height of 38 inches. Upper layer 98 of bed 42 was comprised of activated carbon and had a height of 18 inches. Intermediate layer 100 of bed 42 was comprised of silica sand and had a height of 12 inches. Lower layer 102 of bed 42 was comprised of garnet and had a height of 8 inches.

Next, the filtered water stream flowed via conduit 46 to product water tank 52. As the filtered water stream flowed through conduit 46, chlorine was added to the water stream in an amount sufficient to provide a chlorine concentration of 3 parts per million by weight.

This test achieved a nitrate removal efficiency of 90.42%. The calculated cost of the ethanol used was $0.12 per 1000 gallons of water treated. The calculated cost of the biostimulant used was $0.02 per 1000 gallons of water treated.

EXAMPLE 2

Example 1 was repeated except that (a) no biostimulant was used and (b) ethanol was added to the source water stream in an amount sufficient to yield an ethanol concentration of 54.64 parts per million by weight. The water product produced in this test had a nitrate concentration of 7.78 parts per million by weight (1.76 parts per million by weight as nitrogen). Thus, a nitrate removal efficiency of 86.43% was achieved at a calculated ethanol cost of $0.17 per 1000 gallons of water treated.

Both Examples 1 and 2 demonstrate the effectiveness of using a sulfur-containing oxygen scavenger. Moreover, example 2 clearly demonstrates the efficiency and cost benefits obtained by the use of a biostimulant.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A process for treating water, said water including at least one substance which is at least partially removable from said water by biological denitrification, said process comprising the steps of:
    (a) removing at least a portion of said substance from said water by biological denitrification using microorganisms effective for performing said biological denitrification; and
    (b) feeding a biostimulant to said microorganisms effective for increasing the rate at which said biological denitrification occurs, said biostimulant being derived from at least one plant steroidal compound.

2. A process for treating water, said water including at least once substance which is at least partially removable from said water by biological denitrification, said process comprising the steps of:
    (a) removing at least a portion of said substance from said water by biological denitrification using microorganisms effective for performing said biological denitrification; and
    (b) feeding a biostimulant to said microorganisms effective for increasing the rate at which said biological denitrification occurs, said biostimulant being derived from at least one member selected from the group consisting of sea kelp steroids, aloe plant steroids, and yucca cactus plant steroids.

3. The process of claim 1 wherein said biostimulant is fed to said microorganisms in accordance with step (b) by adding an effective amount of said biostimulant to said water to obtain a concentration in the range of from about 0.2 to about 0.4 parts by weight of said biostimulant per million parts by weight of said water.

4. A process for treating water, said water including at least one substance which is at least partially removable from said water by biological dentrification, said process comprising the steps of:
    (a) removing at least a portion of said substance from said water by biological denitrification using bacteria effective for performing said biological denitrification; and
    (b) feeding a biostimulant to said bacteria effective for increasing the rate at which said bacteria produce enzymes used in said biological denitrification, said biostimulant being derived from at least one plant steroidal compound.

\* \* \* \* \*